Figure 1:
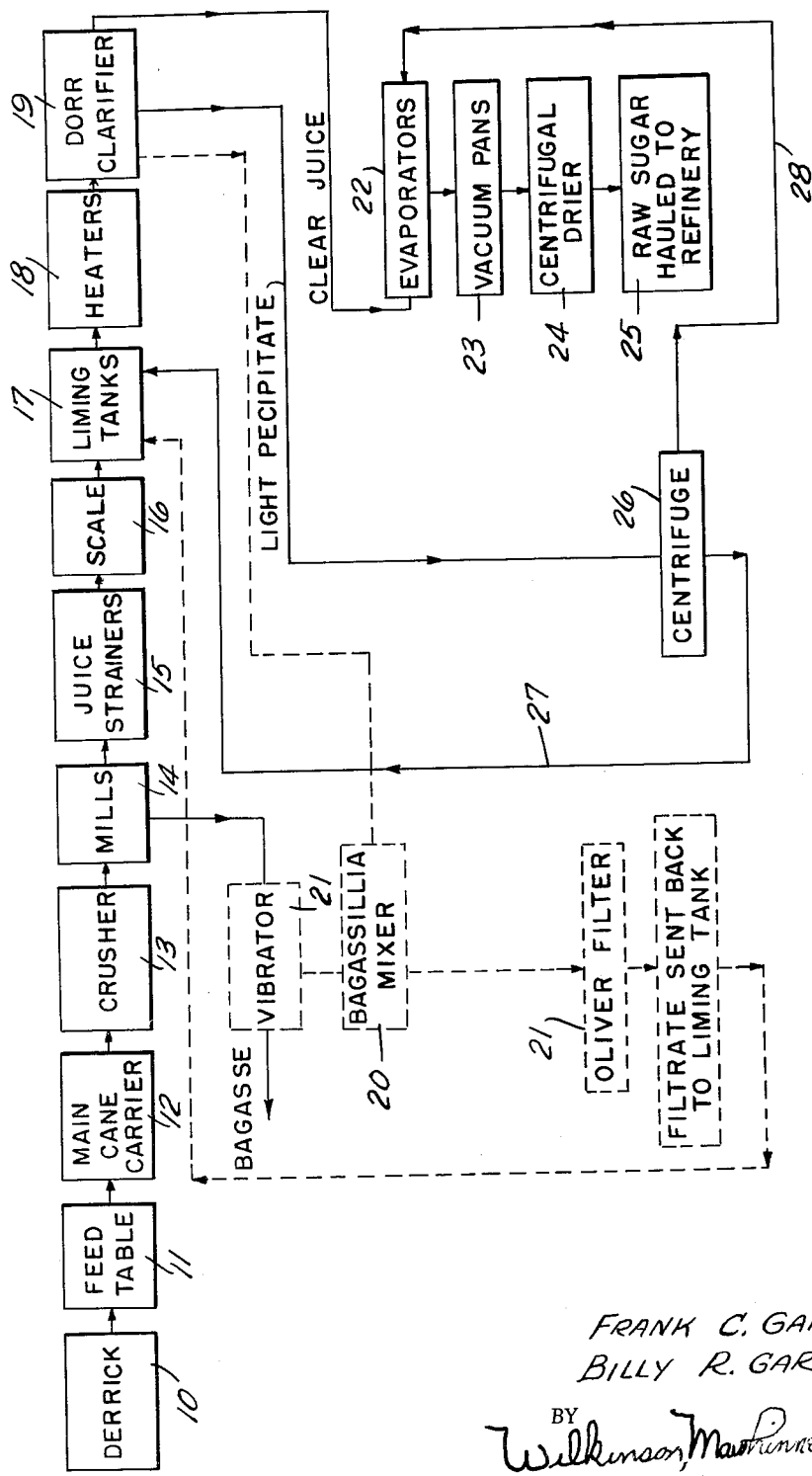

INVENTORS
FRANK C. GAIENNIE &
BILLY R. GARRARD

2,992,140
PROCESS FOR REMOVING SUGAR FROM RAW SUGAR CANE

Frank C. Gaiennie, R.F.D. 2, Box 24, and Billy R. Garrard, P.O. Box 534, both of Thibodaux, La.
Filed Oct. 8, 1958, Ser. No. 766,097
9 Claims. (Cl. 127—56)

The present invention relates to a process for removing sugar from raw sugar cane.

When sugar cane is mechanically harvested, particularly mechanically loaded from heap rows into cane carts for transport to the mill where the sugar is extracted from the cane stalk, dirt or mud is mixed with the cane stalks and this mud enters the refining cycle and must be removed. During moderately dry grinding or harvest seasons, the ratio of mud to cane runs 20 to 80 percent. During rainy harvest and grinding seasons, the percentage of mud to cane increases from 20 to 40 percent due to the manner in which the cane is cut and loaded by dozing the cane along the heap row, employing a grab and loading same into a cane cart.

When the cane arrives at the mill for processing, a derrick loads the cane stalks onto a feed table where the cane stalks are sprayed with water in an effort to remove some of the dirt intermingled with the cane and which becomes mud. The cane leaving the feed table is advanced to the cane crusher mills in a manner well known in this art. The juice extracted from the crushed cane stalks is then passed over juice strainers, through scales and thence to liming tanks where calcites are introduced into the juice, water, mud mixture to precipitate the mud. The mixture of cane juice, water, mud and lime is then passed through heaters to raise the temperature evenly to a range of from 200° F. to 210° F. and the mixture is then introduced into a clarifier of the type illustrated and described in U.S. Patent No. 1,515,702.

The clear liquid from the top of each clarifier section is then processed through the evaporators, vacuum pans, and centrifugal drier where it is crystalized and prepared for shipment from the sugar house as 96 percent brown sugar. This sugar is then sent to a refinery where the processing from brown to white sugar is completed.

The light precipitate or mud-like mass which resembles a dirty grade of oil and which contains a high quantity of mud is led from the bottom of the Dorr clarifier to a vibrator assembly below the bagasse discharge conveyor just beyond the final mill crushing station. The vibrators shake down the bagassilia, a fine fiber-like lint mass which is mixed with the mud-like mass from the central bottom of the Dorr clarifier. The mixture of mud, sugar and bagassilia is led to the Oliver filter where the mud is removed.

When the mud content rises above normal (20 percent) the effective operation of the Oliver filter falls off to a point of inoperativeness where the mud gets ahead of the filter and the material being supplied from the Dorr clarifier to the Oliver filter must be shut off or discharged into the field until the Oliver filter can catch up. This results in a considerable loss to the cane farmer whose cane is being processed.

Our invention contemplates a replacement of the Oliver filter, the bagasse vibrators, bagassilia mixing chamber and auxiliary piping associated therewith. The processing time is reduced and regardless of the rainy condition during harvest, the mud situation is kept under control. We propose subjecting the fluid discharge from the bottom of the Dorr clarifier to a centrifuging operation, whereby the light fraction, being sugar juice, less the mud, is either directed back to the liming tanks for recycling or when exceptionally clear it is led directly to the evaporators for the final stages of refining and crystallization.

Referring now to the flow chart, FIGURE 1, 10 designates a derrick which loads cut cane stalks on a feed table 11 which supplies cane to a main cane carrier 12. The cane stalks are chopped or cut into short lengths and introduced into the crusher mills 13 and 14. These crusher mills are generally in three or four stages and consist of serrated rolls, intermeshing, between which the cane stalks are introduced and these rollers under high hydraulic pressure crush the stalks to remove the sugar therefrom. After passing the second stage, a mixture of the sugar syrup and water is directed upon the crushed sugar cane being advanced through the crusher mills which expands or swells the fibers so that they may be further crushed to permit extraction of further sucrose therefrom. At the end of the fourth or final stage of the crusher mills, the cane juice is then passed by conduits to the juice strainers 15 where it is subjected to a straining operation through a mesh or foraminous plate running about 120 count. The juice, after having been strained, is then sent to scales 16 where it is weighed. After the weighing operation the sugar juice, which is actually a mixture of sugar juice, water, mud or other foreign matter, is fed to a liming tank 17 where a calcite is introduced for purposes of precipitating the foreign matters or impurities from the sugar juice. This liming mixture is then passed through a set of heaters 18 which elevate the temperature of the solution containing the lime, sucrose, water and mud. The mixture led from the heaters 18 is then introduced into a Dorr clarifier 19 which may be, for example, a four-stage clarifier well known in this art and which purports to be manufactured in accordance with U.S. Patent 1,515,702. This clarifier permits the removal of the relatively clear sugar juice from the top of each of its stages, the calcite precipitation having permitted the foreign matter to be pulled down into the bottom of the clarifier in the form of a light precipitate. This light precipitate contains the mud which is led from the bottom of the Dorr clarifier to a mixing chamber 20 where bagassilia is supplied from a series of vibrators 21 which operate upon the bagasse which is the residue of the sugar cane stalk after the sugar has been removed therefrom and which receives the crushed residue from the final stage of the crusher mill 14. The bagassilia is a fine lint-like mass or fiber which is shaken down from the bagasse and which is introduced into the light precipitate from the Dorr clarifier and this composite of bagassilia and light precipitate is then fed to an Oliver filter 21 where the bagassilia cooperates with the outer screen of the Oliver filter much in the manner that a filter paper cooperates with a funnel. The bagassilia forms a covering over the outer screen of the Oliver filter and keeps the mud on the outside, permitting only the sugar liquid to go through the Oliver filter. This filtered liquid is then reintroduced into the liming tanks where it goes through another cycle.

The clear juice which has been removed from the top portions of the various stages of the Dorr clarifier is led to evaporators 22 where the water is cooked off and from the evaporators the sugar is then led to vacuum pans 23, thence to a centrifugal drier 24 where the final crystallization takes place and the sugar is then removed from the refinery at a loading station 25 where, for example, it is blown into special trucks for transporting this sugar from the sugar mill.

In accordance with our invention, the Oliver filter 21, bagassilia mixer chamber 20 and vibrators 21 are eliminated. This removes a considerable mass of machinery from the sugar plant, reduces the operating area necessary, the capital investment necessary for these various huge pieces of equipment, and maintenance ever present therewith.

We propose taking the light precipitate from the bottom of the Dorr clarifier 19 and leading the same directly to a centrifuge 26 where, by subjecting the precipitate to a centrifuging action the mud or foreign matter is removed from the light precipitate and the supernatant fluid is then directed back to the liming tanks by conduits 27. If the material centrifuged is very clear, this may be led directly to the evaporators 22 as by conduits 28, thereby eliminating the need for re-cycling the precipitate supernatant fluid back through the liming tanks 17, heaters 18 and Dorr clarifier 19. This accelerates the processing time and by means of eliminating the Oliver filter can cope with the increased mud problem present during wet harvest seasons where the amount of mud transported to the mill with the cane runs materially above the 20 percent and approaching the 40 percent figure set forth hereinabove.

Any centrifuge of the mud type, for instance, that used in the oil fields for removing mud and the like from oil, may be employed for this purpose and this invention is not restricted to a specific type of centrifuge.

The Dorr clarifier has been employed in the sugar industry for a great number of years for stratifying the limed liquid which was limed after having been extracted from the raw sugar cane. The Dorr stratification is based upon a clarifier type of stratification and the bulk of the liquid drawn off the top of each stage of the Dorr clarifier is sent on to the evaporators and the remainder of the refining process. The precipitate or sludge or residue removed from the bottom of the Dorr clarifier is basically a very sweet or high sucrose content of mud. This mud is too rich in sucrose to be thrown away and hence the Oliver filter was employed together with the Oliver filter's auxiliaries such as vibrators and mixing chambers to remove this additional sugar content from the mud. In the sugar industry mud containing more than 2 percent sucrose is expensive mud to be thrown back out into the fields. During the rainy harvest seasons when large quantities of mud are shipped to the mill with the cane to enter the sugar refining process, the sucrose content of the mud has been known to go as high as 6 to 8 percent and it is this additional increase from 1 to 8 percent of sucrose content in the mud that made the Oliver filter a practical solution to the problem at the time of its inception. However, as has been pointed out hereinbefore, the Oliver filter is incapable of handling large quantities of mud and the mud removed from an Oliver filter under these adverse operating conditions has run as high as the 8 percent mentioned. By employing the centrifuge or velocity separation of the present invention, the sucrose content of the mud can be maintained in the area of 1 to 2 percent even when the mud sugar content increases from 20 to 40 percent.

The important variation over the prior art herein is the act of separating the mud or foreign matter from the sugar juice by means of a velocity separation acting upon the differential in specific gravities between the sugar juice and mud or other foreign matter which permits of a positive physical separation of the two.

Although we have disclosed herein the best form of the invention known to us at this time, we reserve the right to all such modifications and changes as may come within the scope of the following claims.

What we claim as our invention is:

1. The process of refining sugar from sugar cane consisting of taking the light precipitate from a clarifier stratification, subjecting the precipitate to a centrifuging action to separate sugar juice from mud, disposing of the mud and subsequently reducing the sugar juice to crystals.

2. The process of refining sugar from sugar cane wherein the precipitate from a clarifier stratification of sugar juice and mud is subjected to velocity separation which separates the mud from the sugar juice, the sugar juice being reduced to crystals.

3. The process of refining sugar from sugar cane comprising crushing the sugar cane stalks to remove the juice therefrom, liming the liquid from the crushing operation, subjecting the limed liquid to a gravity stratification, refining the clear liquid from the stratification into sugar crystals, subjecting the precipitant fluid from the stratification to a velocity separation whereby further clear sugar liquid is separated from the precipitate and refining the clear liquid from the velocity separation into crystals of sugar.

4. The process of claim 3 wherein the clear liquid obtained from the velocity separation is reintroduced into the liming operation for recycling prior to subsequent refinement after stratification.

5. The process of refining sugar from raw sugar canes comprising subjecting raw sugar canes to a crushing operation to remove sugar juice therefrom, subjecting the extracted juice to a liming operation to precipitate foreign matter, subjecting the limed liquid to a clarifier stratification, removing the clear liquid from the stratification and processing same into sugar crystals, subjecting the precipitant from the clarifier stratification to a centrifugal separating action to remove further clear liquid therefrom for refining into sugar crystals, and discarding the waste remaining from the centrifugal separating action.

6. In the process of refining sugar from raw sugar cane, the steps of passing limed heated sugar juice through a clarifying step, removing clarified juice for further conversion, and separately removing wet sediment from the clarifying step and passing said wet sediment through a centrifuge to recover liquid sugar from the sediment.

7. A process in accordance with claim 6 wherein the liquid sugar recovered from the sediment is reintroduced into the main body of sugar juice.

8. The process of claim 7, said liquid sugar recovered from the sediment being reintroduced into the main body of sugar juice at the liming step.

9. The process of claim 7, said clarified juice being thereafter passed through a refining step and said liquid sugar recovered from the sediment being introduced into the refining step.

References Cited in the file of this patent

UNITED STATES PATENTS

| | | |
|---|---|---|
| 978,750 | Homans | Dec. 13, 1910 |
| 1,839,733 | Berge | Jan. 5, 1932 |
| 1,897,424 | Foster | Feb. 14, 1933 |
| 2,478,971 | Lindgren | Aug. 16, 1949 |

OTHER REFERENCES

The International Sugar Journal, article by Smart, November 1946, pp. 293–296.